(12) United States Patent
Yasuda

(10) Patent No.: US 11,853,627 B2
(45) Date of Patent: Dec. 26, 2023

(54) SERVER SYSTEM FOR OBTAINING A TOKEN FOR ACCESSING A SERVICE

(71) Applicant: CANON KABUSHIKI KAISHA, Tokyo (JP)

(72) Inventor: Akihiro Yasuda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/845,734

(22) Filed: Jun. 21, 2022

(65) Prior Publication Data
US 2022/0317951 A1 Oct. 6, 2022

Related U.S. Application Data

(63) Continuation of application No. 17/102,146, filed on Nov. 23, 2020, now Pat. No. 11,409,483.

(30) Foreign Application Priority Data

Nov. 29, 2019 (JP) ................................ 2019-217572

(51) Int. Cl.
*G06F 3/12* (2006.01)
*G06F 21/60* (2013.01)
*H04L 9/40* (2022.01)

(52) U.S. Cl.
CPC .......... *G06F 3/1238* (2013.01); *G06F 3/1207* (2013.01); *G06F 3/1222* (2013.01);
(Continued)

(58) Field of Classification Search
CPC .... G06F 3/1238; G06F 3/1207; G06F 3/1222; G06F 3/1232; G06F 3/1259; G06F 3/1288; G06F 3/1293; G06F 21/608; G06F 3/1267; G06F 3/1204; G06F 3/1203; G06F 3/1224; G06F 3/1285; G06F 21/31; H04L 63/083;
(Continued)

(56) References Cited

U.S. PATENT DOCUMENTS

2016/0050326 A1* 2/2016 Lee .................... H04N 1/00244
358/402
2018/0063374 A1 3/2018 Kanno
(Continued)

FOREIGN PATENT DOCUMENTS

| CN | 102750113 A | 10/2012 |
|---|---|---|
| CN | 107683191 A | 2/2018 |

(Continued)

*Primary Examiner* — Juan M Guillermety
(74) *Attorney, Agent, or Firm* — Canon U.S.A., Inc. IP Division

(57) ABSTRACT

A first server system according to embodiments of the present disclosure includes a control unit configured to instruct a client terminal to display a screen for inputting authentication information to a third server system as the transmission destination of image data registered in a second server system, an acquisition unit configured to acquire information about a printing apparatus capable of printing the image data registered in the second server system, from the third server system that has performed authentication based on the authentication information input via the screen, and a transmission unit configured to transmit the acquired information about the printing apparatus to the second server system.

17 Claims, 16 Drawing Sheets

(52) U.S. Cl.
CPC .......... *G06F 3/1232* (2013.01); *G06F 3/1259* (2013.01); *G06F 3/1288* (2013.01); *G06F 3/1293* (2013.01); *G06F 21/608* (2013.01); *H04L 63/083* (2013.01); *H04L 63/0853* (2013.01)

(58) Field of Classification Search
CPC ..... H04L 63/0853; H04L 51/04; H04L 51/10; G06Q 50/30
See application file for complete search history.

(56) References Cited

U.S. PATENT DOCUMENTS

| | | | | |
|---|---|---|---|---|
| 2019/0095151 | A1* | 3/2019 | Inoue | H04N 1/00464 |
| 2019/0258431 | A1* | 8/2019 | Yamamoto | G06F 3/1238 |
| 2020/0099800 | A1* | 3/2020 | Noguchi | H04N 1/00477 |

FOREIGN PATENT DOCUMENTS

| | | |
|---|---|---|
| CN | 109155748 A | 1/2019 |
| CN | 109558106 A | 4/2019 |
| JP | 2018128843 A | 8/2018 |

\* cited by examiner

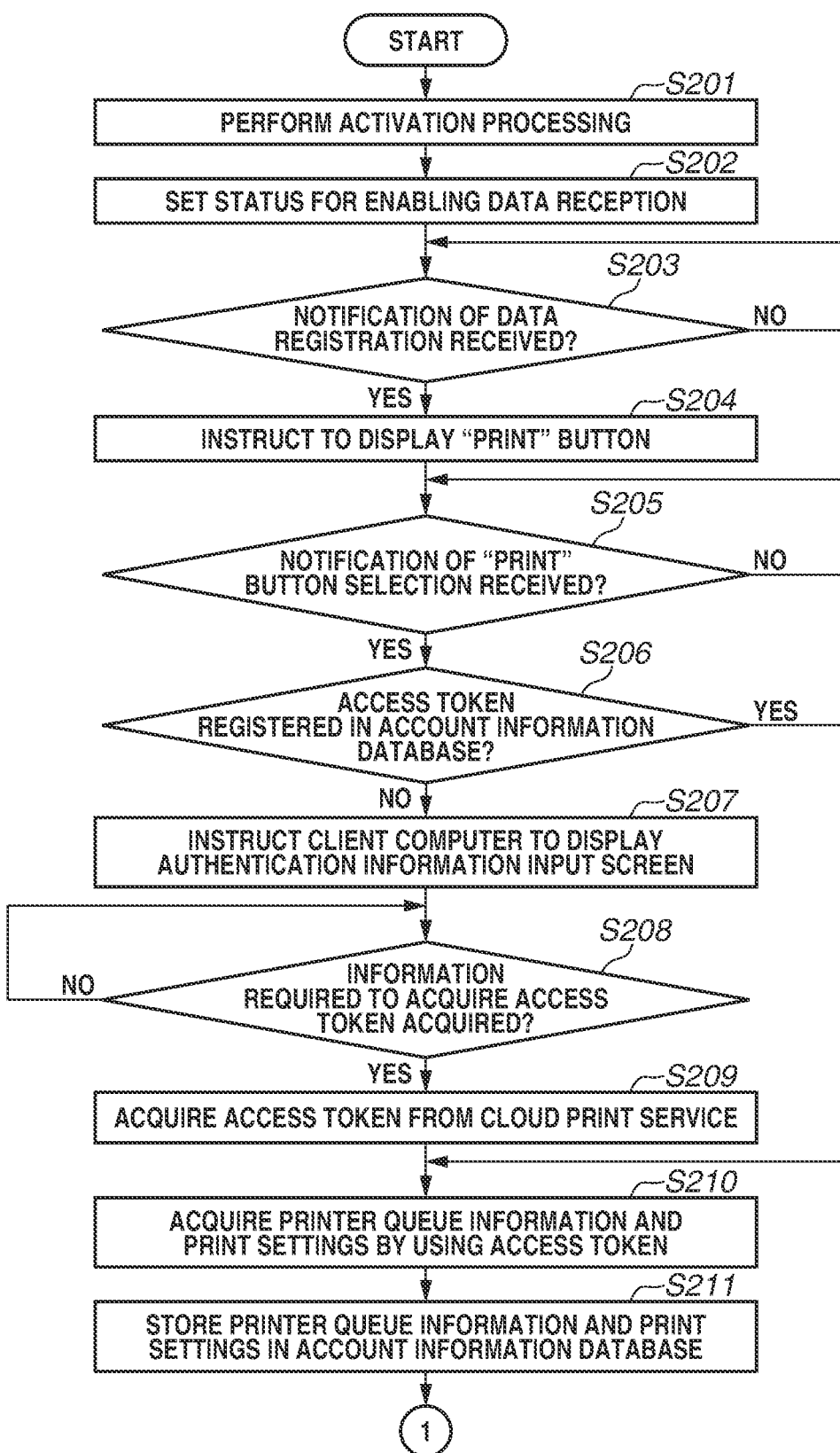

FIG. 10

| APPLICATION ID | USER ID | ACCESS TOKEN | PRINT SETTINGS | PRINTER QUEUE 1 | PRINTER QUEUE 2 | PRINTER QUEUE 3 |
|---|---|---|---|---|---|---|
| xyzabc | 0123456 | abc | DEFAULT SETTINGS {NUMBER OF COPIES: 1, ONE-SIDED/TWO-SIDED SETTING: TWO-SIDED, COLOR MODE: MONOCHROME} 2IN1 + TWO-SIDED {NUMBER OF COPIES: 1, ONE-SIDED/TWO-SIDED SETTING: TWO-SIDED, COLOR MODE: COLOR} | printer01 | printer02 | printer03 |

1001

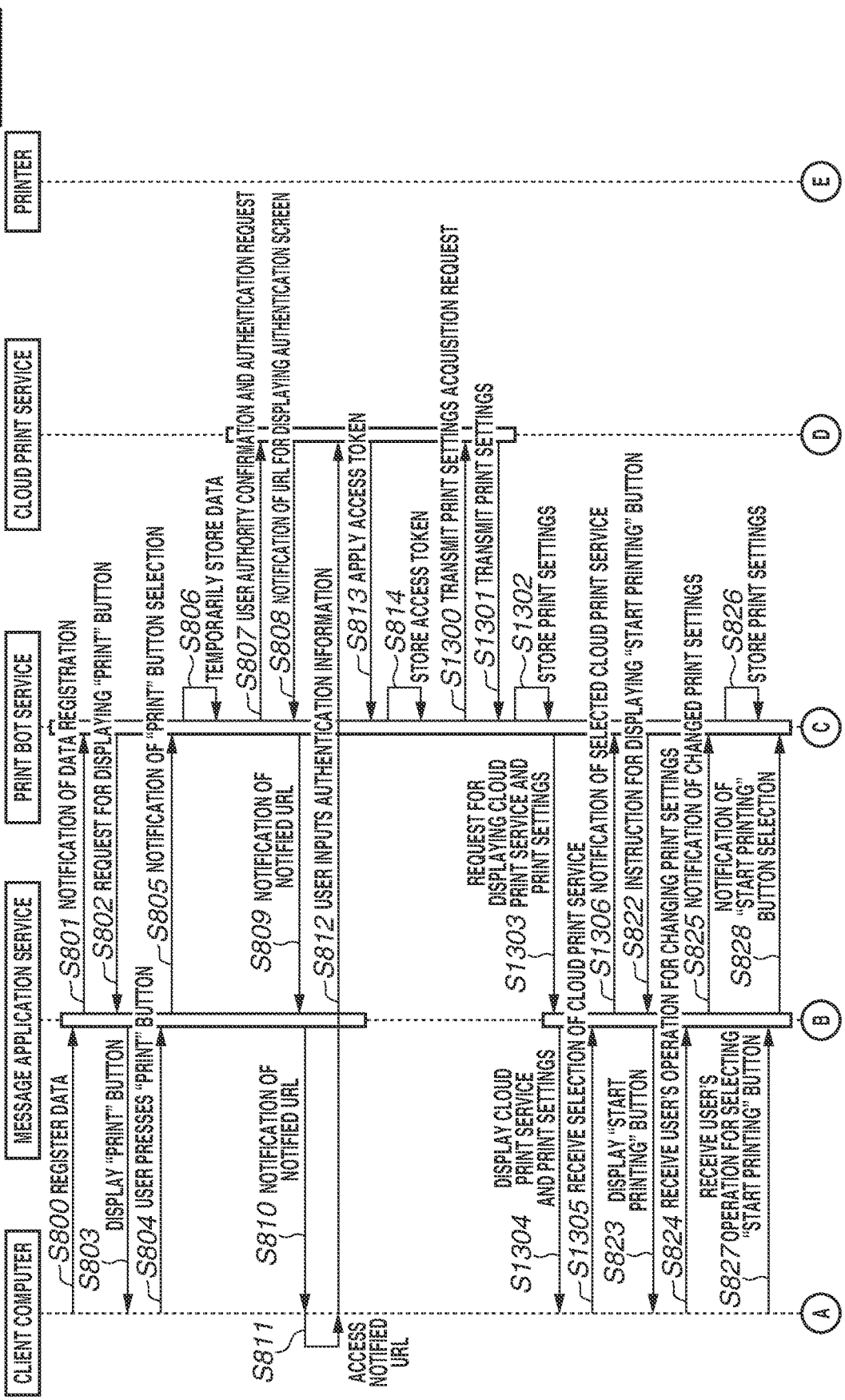

SERVER SYSTEM FOR OBTAINING A TOKEN FOR ACCESSING A SERVICE

CROSS-REFERENCE TO RELATED APPLICATIONS

This application is a Continuation of U.S. patent application Ser. No. 17/102,146, filed Nov. 23, 2020, which claims the benefit of Japanese Patent Application No. 2019-217572, filed Nov. 29, 2019, both of which are hereby incorporated by reference herein in their entirety.

BACKGROUND

Field of the Disclosure

The present disclosure relates to a server system.

Description of the Related Art

Cloud services are becoming popular. Users can refer to and edit data stored in cloud services as well as data stored in client terminals, from any client terminal, accordingly.

There are many types of services and applications using cloud services. For example, chat applications enable users not only to have conversations but also to share document files and image data. Some of the chat applications can cooperate with other cloud services and applications, and automatically answer user inputs (hereinafter such services are referred to as bot services). A bot service is an application that runs on an information processing apparatus for offering automatic answering services. The bot service automatically answers the input when, for example, a user inputs words into a chat application service and the words include predetermined words.

Since chat applications are typically used for conversations between users, chat applications may not be provided with printing functions. In the apparatus discussed in Japanese Patent Application Laid-Open No. 2019-144698, a user registers a bot service with print setting functions by using a chat application. The bot service works as a partner of conversation. When image data is registered, the bot service makes an inquiry to the user about whether to print the registered image data. When the user issues a print instruction by using the chat application, a printer registered in association with the bot service executes printing of the image data. Using the bot service in this way enables an application not having print functions to print data registered in the chat application.

When managing document and image data by using a cloud service, the user can register, in the cloud service, information about a printer to be used for printing document and image data registered in the cloud service. The cloud service stores a user in association with printers that can be used by the user. When the user logs into the cloud service, the user can select a printer to be used for printing from the printers associated with the user.

In contrast, when performing printing by using a bot service through the chat application, the user needs to register the printer to be used in the bot service. When the user registers a password issued by the printer in the bot service, the printer is associated with the chat application operating on the client terminal used by the user on the server that offers the bot service.

If the user tries to print the document and image data registered in the chat application by using a printer previously registered in the cloud service, the user needs to perform an operation for registering information about the printer in the bot service again.

SUMMARY

A server system according to embodiments of the present disclosure is a first server system that includes a control unit configured to instruct a client terminal to display a screen for inputting authentication information to a third server system as the transmission destination of image data registered in a second server system, an acquisition unit configured to acquire information about a printing apparatus capable of printing the image data registered in the second server system, from the third server system that performed authentication based on the authentication information input via the screen, and a transmission unit configured to transmit the acquired information about the printing apparatus to the second server system.

Further features of the present disclosure will become apparent from the following description of exemplary embodiments with reference to the attached drawings.

BRIEF DESCRIPTION OF THE DRAWINGS

FIG. 7A is a flowchart illustrating an example of processing performed by the print bot service according to a first exemplary embodiment.

FIG. 10 illustrates an example of a table managed by an account information database of the print bot service according to the present exemplary embodiments.

DESCRIPTION OF THE EMBODIMENTS

Figure 1:
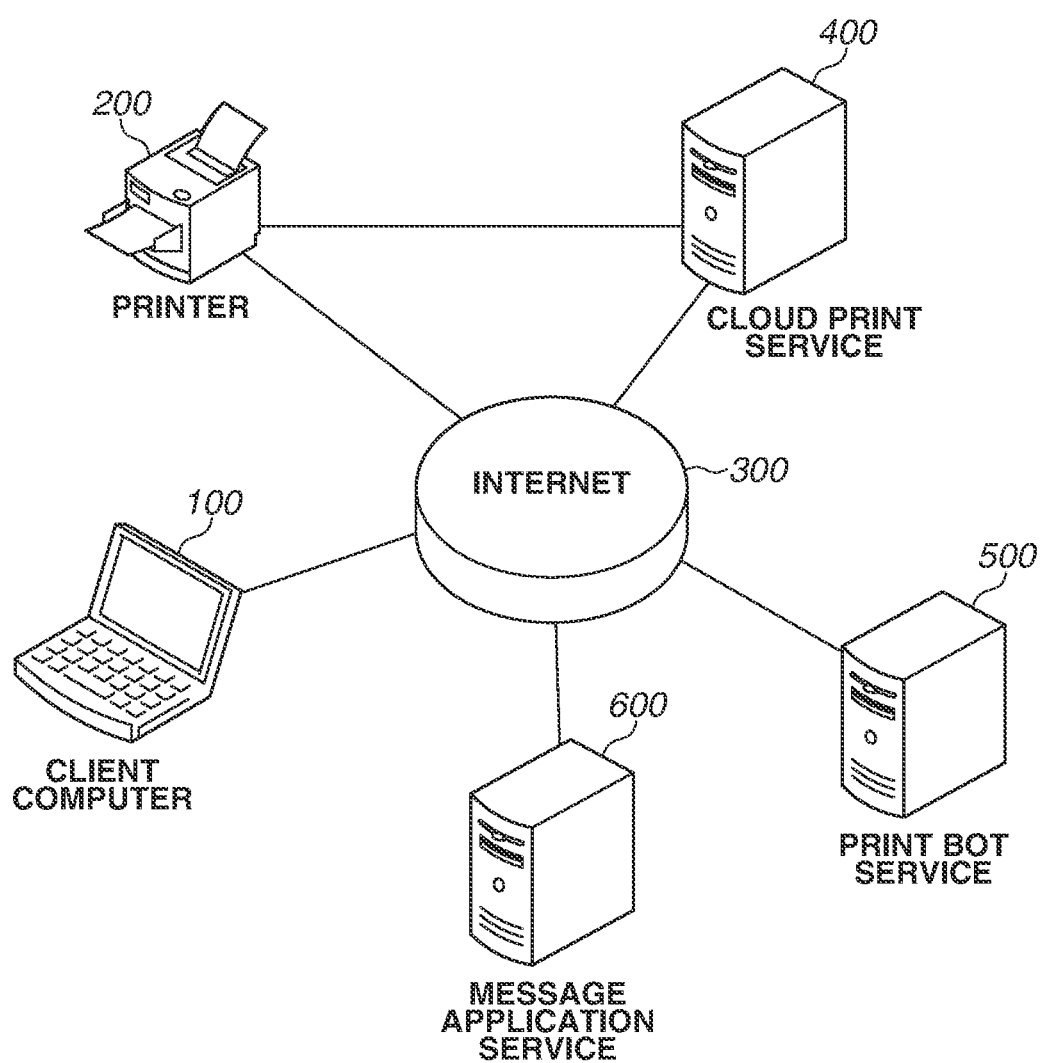
FIG. 1 is a block diagram illustrating an example of a configuration of a printing system according to present exemplary embodiments.

Each of the embodiments of the present disclosure described below can be implemented solely or as a combination of a plurality of the embodiments or features thereof where necessary or where the combination of elements or features from individual embodiments in a single embodiment is beneficial. FIG. 1 is a block diagram illustrating an overall configuration of a system according to embodiments of the present disclosure. This system includes a client computer 100, a printer 200, a cloud print service 400, a print bot service 500, and a message application service 600. The print bot service 500 may be considered as a first server system 500, the message application service 600 as a second server system 600, and the cloud print service 400 as a third server system 400.

The client computer 100 is a client terminal, such as a personal computer (PC), smart phone, and tablet terminal, operated directly by a user. The printer 200 receives print data in a page description language (PDL) from the client computer 100 and the cloud print service 400 and prints the print data. According to the exemplary embodiments, the printer 200 may be a single function printer (SFP) having only print functions, or a multifunction printer (MFP) having print functions, scan functions, and copy functions. The cloud print service 400 includes one or more information processing apparatuses to manage document and image data used for printing. The cloud print service 400 is a server system for performing print setting for printing and generating PDL data. The message application service 600 is a server system including one or more information processing apparatuses. The message application service 600 provides the user operating the client computer 100 with functions of transmitting and receiving messages to/from other client computers (not illustrated). According to the exemplary embodiments, the user transmits and receives document and image data by using the message application service 600. According to the present exemplary embodiments, the message application service 600 transmits document and image data to be printed to the print bot service 500.

The print bot service 500 is a server system including one or more information processing apparatuses. The print bot service 500 is a server system for receiving print data including document and image data from the message application service 600 and providing the print data to the cloud print service 400. The print bot service 500 also receives a text input by the user from the message application service 600 and analyzes the text. If a predetermined character string is included in the text as a result of the text analysis, the print bot service 500 starts processing related to printing using the cloud print service 400. According to the present exemplary embodiments, the message application service 600 and the print bot service 500 cooperate with each other to print document and image data registered in the message application service 600 even if the message application service 600 does not have printing functions.

The cloud print service 400, the print bot service 500, and the message application service 600 are server systems implemented on a cloud service including a plurality of server apparatuses.

Figure 2:
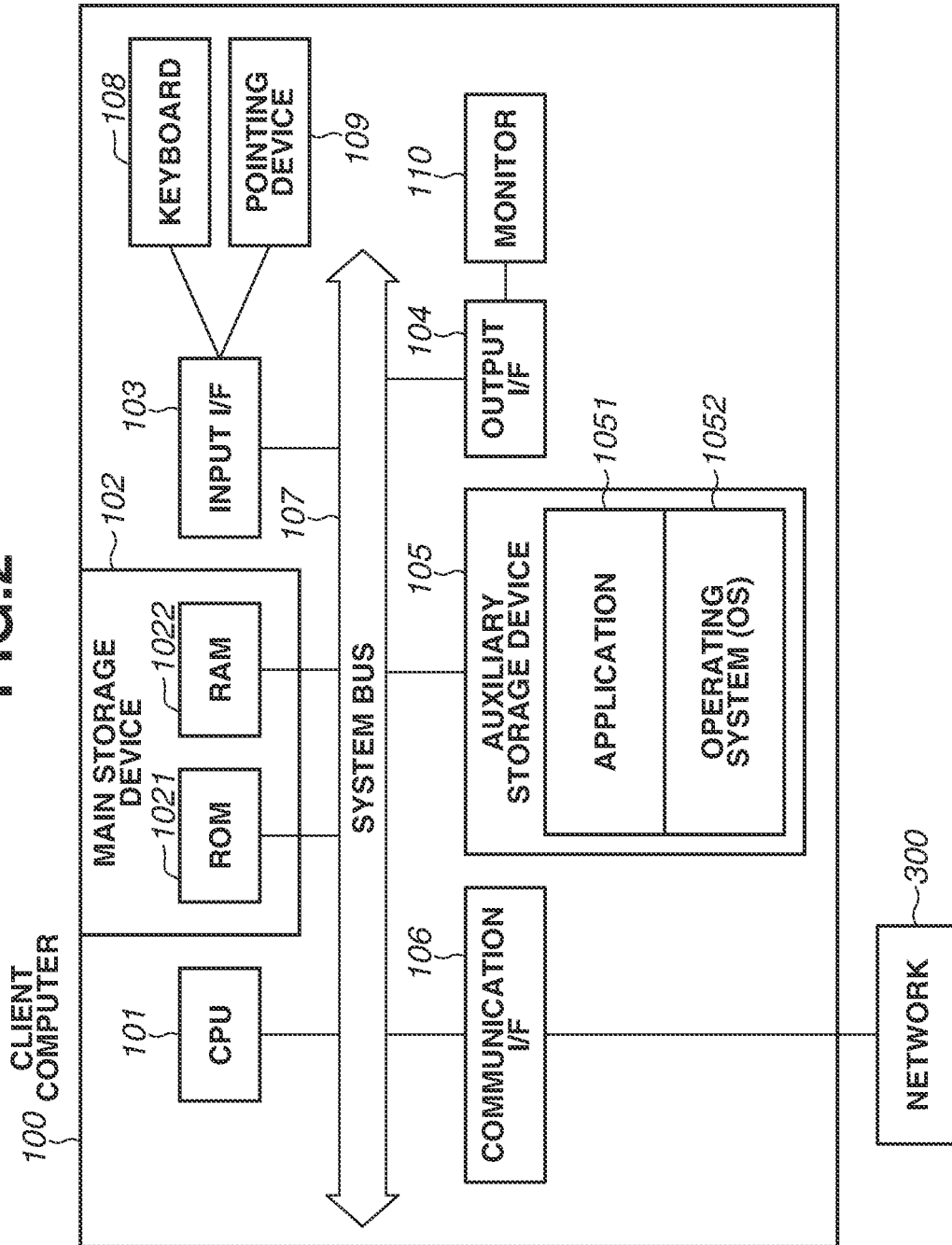
FIG. 2 is a block diagram illustrating an example of a hardware configuration of a client computer according to the present exemplary embodiments.

FIG. 2 is an example of a block diagram illustrating a hardware configuration of the client computer 100 according to the present exemplary embodiments.

A central processing unit (CPU) 101 controls the entire apparatus according to programs stored in a read only memory (ROM) 1021 or a random access memory (RAM) 1022 included in the main storage device 102 or in an auxiliary storage device 105. The RAM 1022 is also used as a work area by the CPU 101 to perform various processing. The auxiliary storage device 105 stores applications 1051 and an operating system (OS) 1052.

An input interface (I/F) 103 receives an input from an external apparatus. The input I/F 103 is connected to a keyboard 108 and a pointing device 109, such as a mouse, and touch panel. Input apparatuses, such as the keyboard 108, mouse, and touch panel, are devices used by the user to output various instructions to the client computer 100 via the input I/F 103. An output I/F 104 outputs data to an output apparatus, such as a monitor 110. The client computer 100 is connected with the printer 200, the message application service 600, and the cloud print service 400 via a network (e.g., the Internet) 300 connected to a communication I/F 106. A system bus 107 is a common data system bus used to exchange each piece of data between hardware modules configuring the client computer 100.

Figure 3:
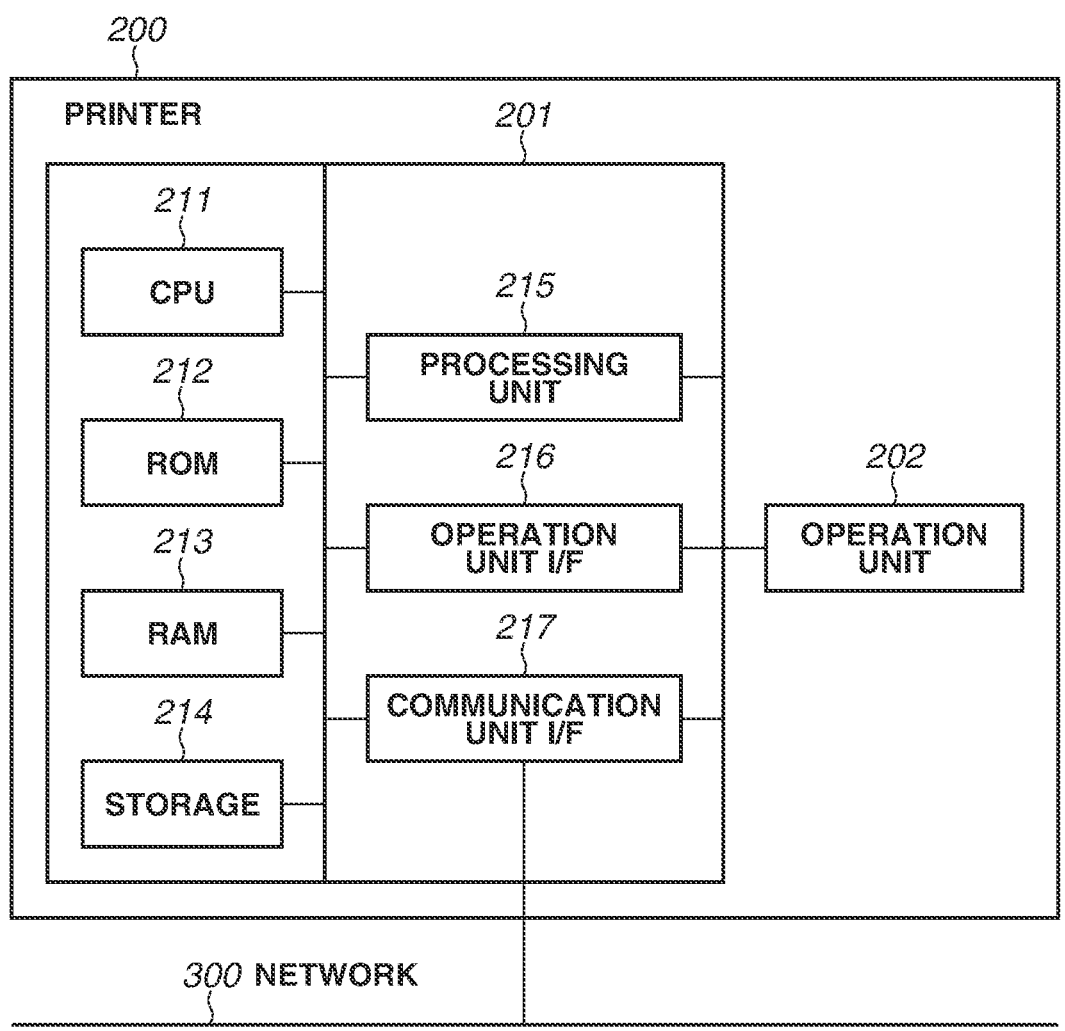
FIG. 3 is a block diagram illustrating an example of a hardware configuration of a printer according to the present exemplary embodiments.

FIG. 3 illustrates functional blocks of a printer as an example of an image processing apparatus according to the present exemplary embodiments.

A control unit 201 including a CPU 211 controls entire operations of the printer 200. The CPU 211 reads a control program stored in a ROM 212 or a storage 214 and performs various controls, such as print control and read control. The ROM 212 stores control programs that can be executed by the CPU 211. The RAM 213 is a main storage device of the CPU 211 and is used as a work area or a temporary storage area for loading various control programs. The storage 214 stores print data, image data, various programs, and various setting information. According to the present exemplary embodiments, an auxiliary storage device, such as a hard disk drive (HDD), is used for the storage 214. However, a nonvolatile memory, such as a solid state drive (SDD), may be used instead of an HDD. Hardware components, such as the CPU 211, the ROM 212, and the RAM 213, configure what is called a computer.

A processing unit 215 is provided with functions of a raster image processor (RIP) for rasterizing the print data received via a network and generating a print image. The processing unit 215 is also provided with an image processing capability and is capable of performing image resolution conversion and correction processing. Although, in the present exemplary embodiments, the processing unit 215 is implemented by hardware circuitry, such as an application specific integrated circuit (ASIC) and a field programmable gate array (FPGA), the present disclosure is not limited thereto. For example, the printer 200 may include a processor for image processing applications, and the processor may execute an image processing program to achieve image processing and print data rasterizing processing. The CPU 211 may also execute an image processing program to perform image processing and print data rasterizing processing. The image processing may be performed with the combination of these pieces of processing.

An operation unit I/F 216 connects the operation unit 202 and the control unit 201. The operation unit 202 includes a liquid crystal display (LCD) unit having touch panel functions and various hardware keys. The operation unit 202 functions as a display unit for displaying information and a reception unit for receiving user instructions. A print image generated as a result of print data analysis by the processing unit 215 is transferred from the control unit 201 to a printing unit (not illustrated) via a printer I/F (not illustrated). The printing unit receives a control command and a print image via the control unit 201. Based on the received image, the printing unit prints an image on a sheet fed from a sheet cassette (not illustrated).

The control unit 201 is connected to the network 300 via a communication unit I/F 217. The communication unit I/F 217 transmits an image and information to a communication apparatus on the network 300 and receives print data and information from a communication apparatus on the network 300.

In the present exemplary embodiments, the printer 200 is an SFP having only print functions. However, the printer 200 may include a reading unit having copy and scan functions. In this case, the reading unit reads a document, and the generated image data is stored in the storage 214.

Figure 4:
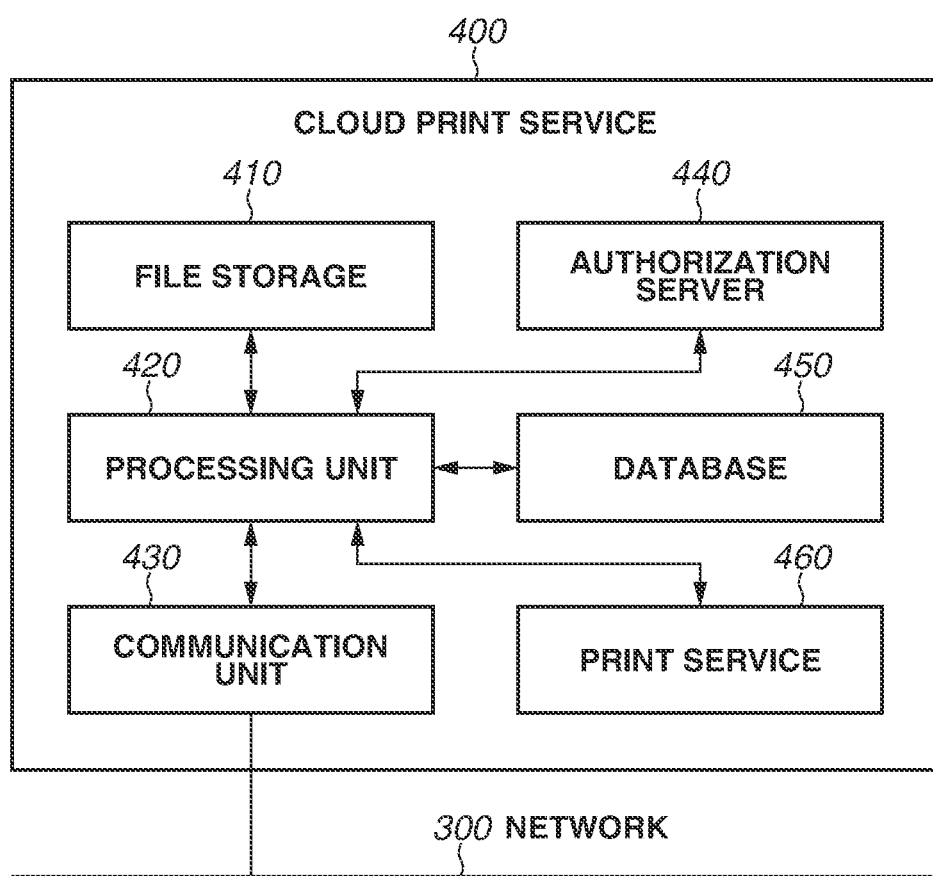
FIG. 4 is a block diagram illustrating an example of a software module configuration of a cloud print service according to the present exemplary embodiments.

FIG. 4 is a block diagram illustrating function modules of the cloud print service 400 according to the present exemplary embodiments. The cloud print service 400 is a server system including one or more information processing apparatuses. Each information processing apparatus has a similar configuration to the client computer 100 illustrated in FIG. 2.

The cloud print service 400 according to the present exemplary embodiments transmits print data to a printer registered in the cloud print service 400 via the network 300, based on a print instruction received from outside, and instructs the printer to perform printing. The cloud print service 400 includes a file storage 410, a processing unit 420, a communication unit 430, an authorization server 440, a database 450 and a print service 460.

The file storage 410 stores a print job to be transmitted to the printer 200 via the communication unit 430. The authorization server 440 includes an authentication module for performing authentication processing on the user accessing the cloud print service 400. The authorization server 440 manages authentication information used for accessing account information stored in the database 450. The database 450 stores the account information for the user, a printer queue and print settings associated with the user, and device information for the printer 200. The print service 460 includes print service modules related to the reflection of the print settings and rendering. The processing unit 420 controls each module included in the authorization server 440 and the print service 460 to control processing of each module.

Figure 5:
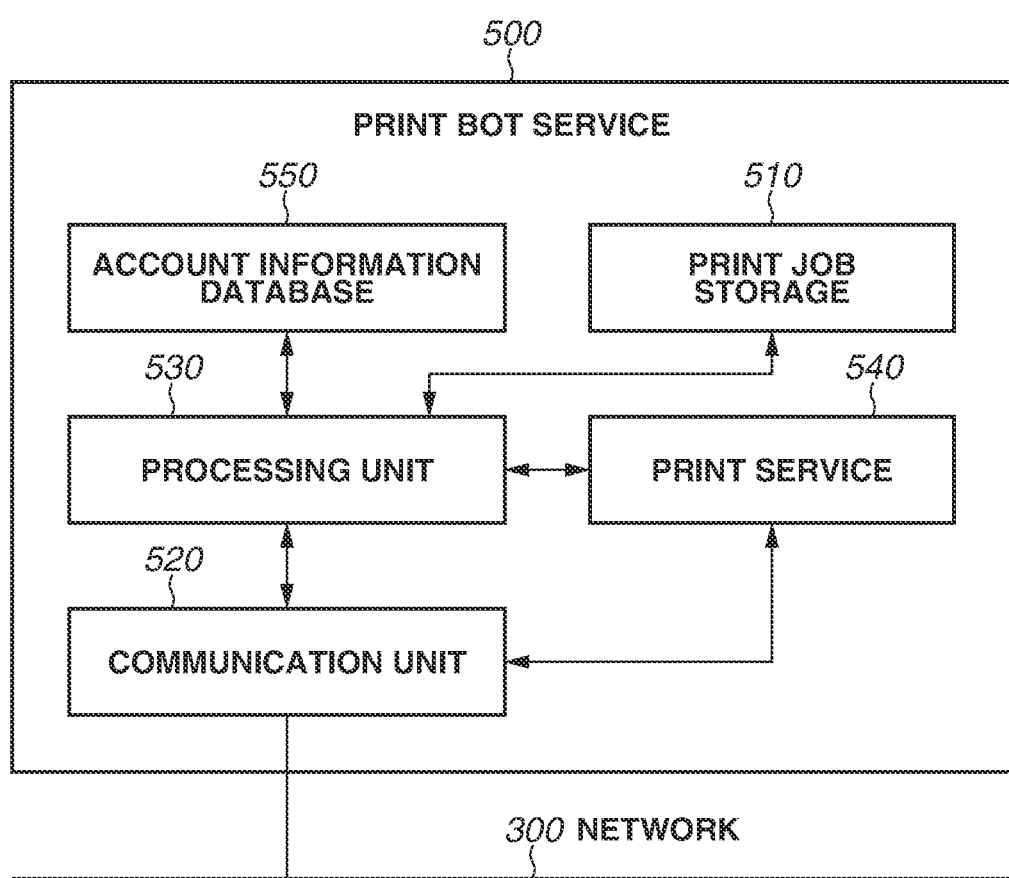
FIG. 5 is a block diagram illustrating an example of a software module configuration of a print bot service according to the present exemplary embodiments.

FIG. 5 is a block diagram illustrating function modules of the print bot service 500 according to the present exemplary embodiments. The print bot service 500 includes one or more information processing apparatuses having a similar configuration to the client computer 100 illustrated in FIG. 2.

The print bot service 500 receives an instruction from the message application service 600, returns the result of the instruction to the message application service 600, and instructs the client terminal to display the result. The print job storage 510 is a storage module for storing printing target image and document data input via the message application service 600. A communication unit 520 is a communication module for communicating with other apparatuses and services via the network 300. A processing unit 530 is a module for processing data transmitted from the client terminal and transmitting a job to the cloud print service 400. A print service 540 is a printing-related module group for storing changes of the print settings and associating the print settings with a print job. The print settings changed by the print service 540 are reflected to the job by the print service 460 illustrated in FIG. 4. An account information database 550 stores user data used for job management and authentication information storage. The print bot service 500 includes the above-described function group.

Figure 6:
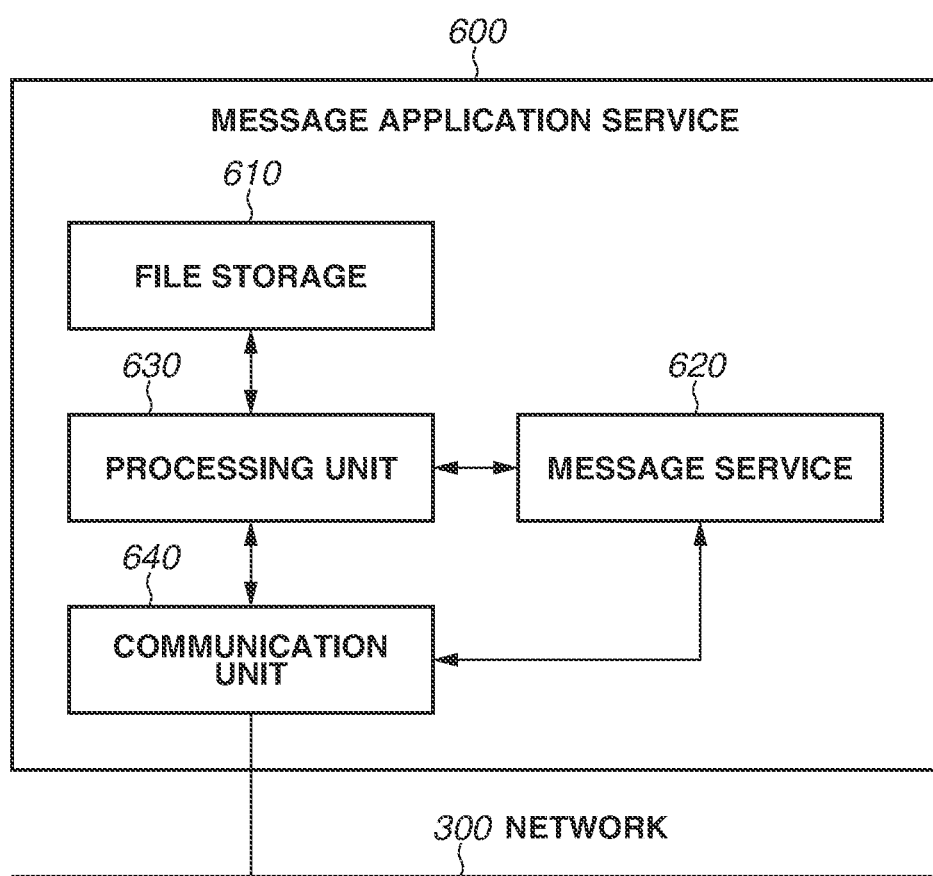
FIG. 6 is a block diagram illustrating an example of a software module configuration of a message application service according to the present exemplary embodiments.

FIG. 6 is an example a block diagram illustrating function modules of the message application service 600 according to the present exemplary embodiments. The message application service 600 includes a file storage 610, a message service 620, a processing unit 630, and a communication unit 640. When the user operates the message application service 600 via a web browser of the client computer 100, messages and data are registered in the message application service 600. In the present exemplary embodiments, the message application service 600 is an application operating on a web browser. However, the message application service 600 may be an application installed in the client computer 100.

Firstly, a method for registering the printer 200 in the cloud print service 400 according to the present exemplary embodiments will be described with reference to the sequence diagram illustrated in FIG. 12.

Figure 12:
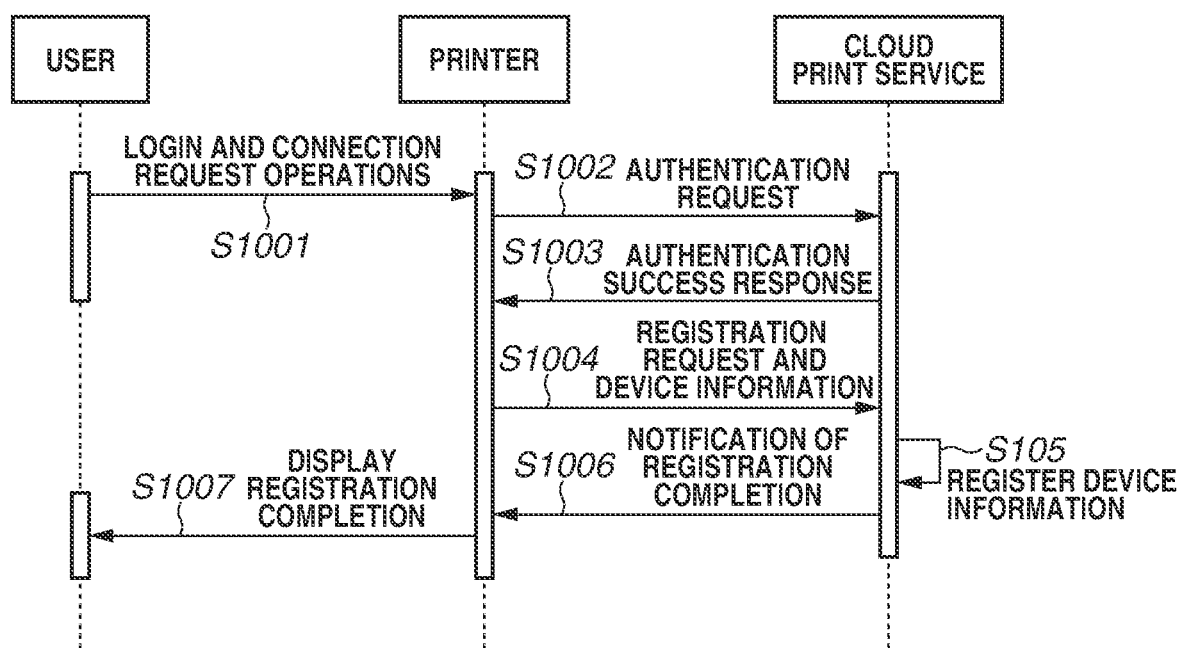
FIG. 12 is a sequence diagram illustrating processing for registering a printer in the cloud print service according to the present exemplary embodiments.

The sequence illustrated in FIG. 12 is an example of a method for registering the printer 200 in the cloud print service 400. The printer 200 may be registered in the cloud print service 400 by using other methods.

In step S1001, the user logs into the printer 200 from the operation unit 202 of the printer 200, and then instructs the printer 200 to access the cloud print service 400. The printer 200 accesses the cloud print service 400 when, for example, the user selects a predetermined icon displayed on the operation unit 202 of the printer 200. The printer 200 having web browser functions accesses the Uniform Resource Locator (URL) of the cloud print service 400 when the user selects a predetermined icon. The printer 200 displays a screen for the user to input information used for the authentication for logging into the cloud print service 400. The printer 200 displays this screen on the operation unit 202 of the printer 200. The user inputs, to the operation unit 202, a user name (user ID) and password used for logging into the cloud print service 400.

In step S1002, after the printer 200 receives an authentication request to the cloud print service 400 from the user, the printer 200 transmits the authentication request to the cloud print service 400 using the user ID and password input in step S1001. The cloud print service 400 receives the user ID and password transmitted from the printer 200. The authorization server 440 then performs the user authentication. In step S1003, the cloud print service 400 transmits a connection success response to the printer 200 if the authentication is successful. In step S1004, the printer 200 transmits a registration request and printer information for registering the printer 200 in the cloud print service 400 to the cloud print service 400 if the printer 200 receives the connection success response from the cloud print service 400. According to the present exemplary embodiments, the printer 200 transmits device information for identifying each individual device as the printer information. The device information is, for example, a Universally Unique Identifier (UUID), a Service Set Identifier (SSID), or the printer name.

In step S1005, after receiving the registration request and the device information from the printer 200, the cloud print service 400 links the identification information for identifying the login user to the received device information. The identification information for identifying the login user and the received device information are then registered in the database 450. In step S1006, the cloud print service 400 transmits a notification of registration completion to the printer 200. In step S1007, the printer 200 displays the notification of registration completion on the operation unit 202 if the printer 200 receives the notification of registration completion from the cloud print service 400. As a result of the above-described processing, a table is generated in the database 450 of the cloud print service 400; the table associates the identification information for identifying the user with the device information about the printer 200 the user can use.

If printers perform the processing illustrated in FIG. 12, a plurality of pieces of device information can be associated with one piece of identification information.

Procedures for performing printing using a printer registered in the cloud print service 400 will now be described with reference to the sequence diagram illustrated in FIG. 8.

Figure 8:
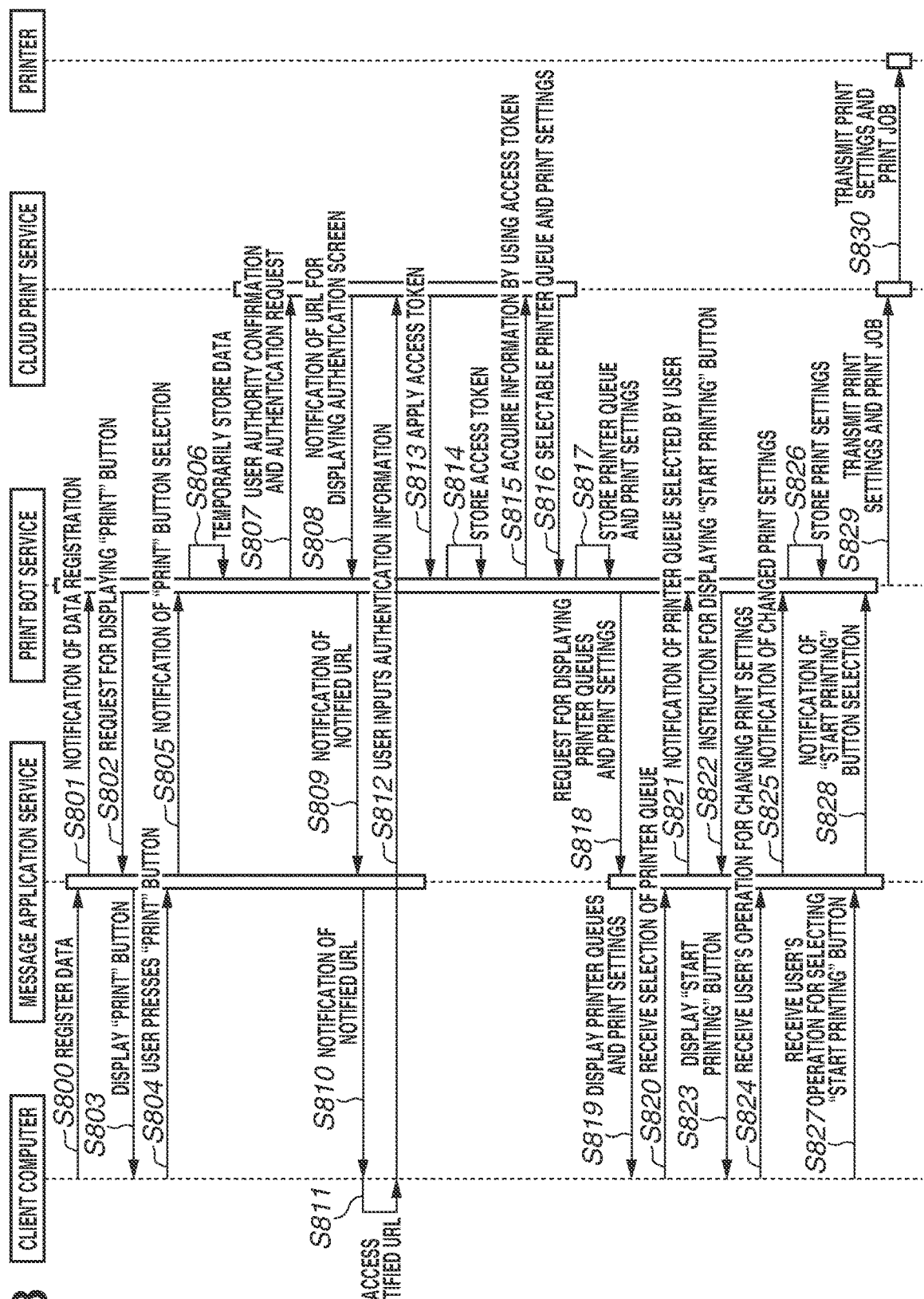
FIG. 8 is a sequence diagram illustrating an example of processing for performing printing by using a printing system according to the first exemplary embodiment.

Referring to FIG. 8, a chat room joined by at least the user and the print bot service 500 is generated in advance in the message application service 600. In the message application service 600, an address for accessing the print bot service 500 is registered in advance. In the print bot service 500, addresses for accessing the message application service 600 and the cloud print service 400 are registered in advance.

Figure 9B:
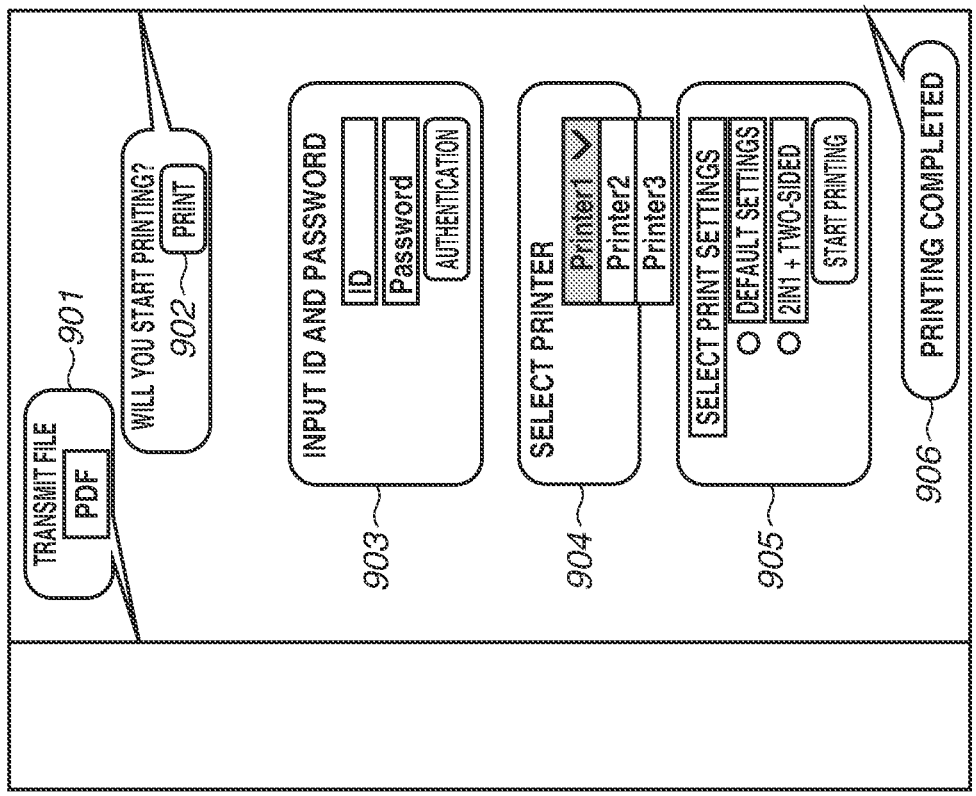
FIG. 9B illustrates another example of a screen displayed on the client terminal by the message application according to the first exemplary embodiment.
Figure 9A:
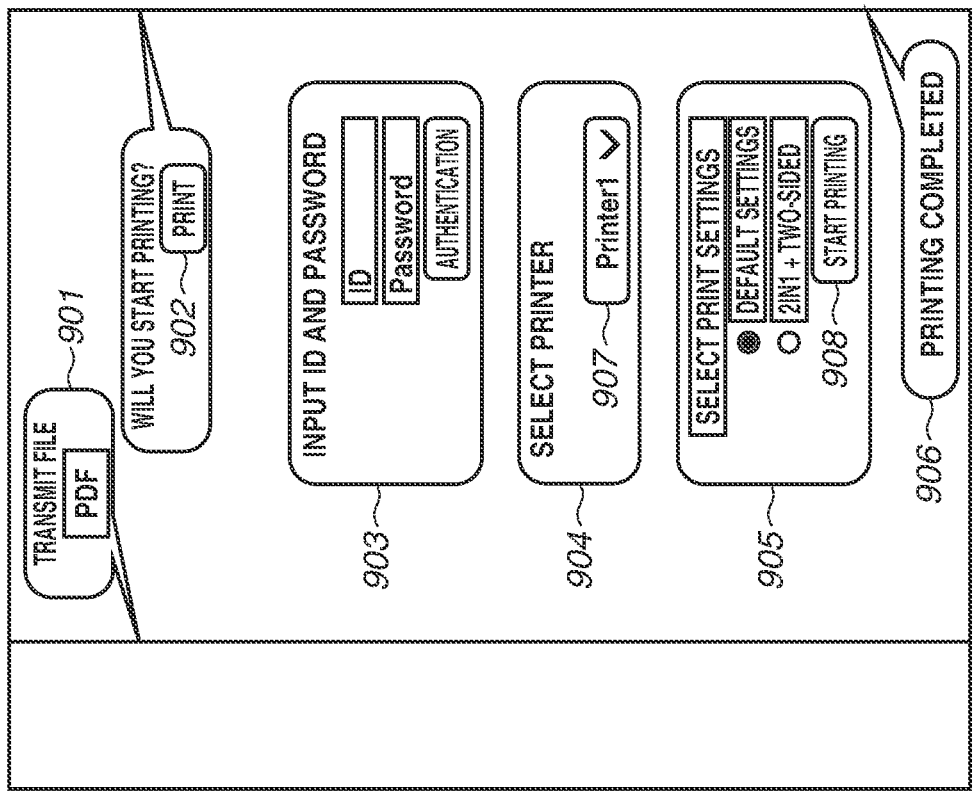
FIG. 9A illustrates an example of a screen displayed on a client terminal by a message application according to the first exemplary embodiment.

In step S800, the user registers the printing target document or image data in a chat room joined by the print bot service 500 on the message application service 600. When the user registers the printing target data in a message application, a message 901 indicating that the data has been registered is displayed in the chat room displayed on the monitor 110 of the client computer 100, as illustrated in FIG. 9A.

In step S801, the message application service 600 notifies the print bot service 500 that the data has been registered. In step S801, an account of the print bot service 500 registered in the message application service 600 detects that the document and image data have been registered and notifies the print bot service 500 of an event. In step S801, the message application service 600 may notify the print bot service 500 of only an event indicating that the document and image data have been registered. Alternatively, the message application service 600 may notify the print bot service 500 of file name and size information for the document and image data together with the event.

In step S802, the print bot service 500 transmits a request for displaying the "Print" button to the message application service 600 in response to the notification from the message application service 600. If the file name of the data registered in the message application service 600 is acquired in step S801, the print bot service 500 may determine whether the extension of the data received by the print bot service 500 is a predetermined extension. Examples of the predetermined extension include extensions indicating image data, such as ".pdf", ".jpg", ".png", and ".bmp", and extensions indicating printable data, such as a spreadsheet and document. If the extension of the registered data is a predetermined extension, the print bot service 500 may transmit a request for displaying a "Print" button 902 to the message application service 600.

In step S803, the message application service 600 displays the "Print" button 902 based on the instruction received in step S802. The "Print" button 902 illustrated in FIG. 9A is an example of a print button. In step S804, if the user selects the "Print" button 902, then in step S805, the account of the print bot service 500 on the message application service 600 transmits a notification indicating the selection of the "Print" button 902 to the print bot service 500. In step S805, the message application service 600 may transmit a character string "Print" to the print bot service 500 instead of the notification indicating the selection of the "Print" button 902. If the print bot service 500 determines that "Print" is included in the received character string, the print bot service 500 performs the following processing.

In step S805, the message application service 600 transmits printing target document or image data to the print bot service 500.

In step S806, the print bot service 500 temporarily stores the data received in step S805 as a candidate of print data. In step S806, the print bot service 500 stores the received data in the print job storage 510 illustrated in FIG. 5.

Upon completion of data storage, the print bot service 500 determines whether the access token for accessing the cloud print service 400 is present. If an access token is absent, then in step S807, the print bot service 500 transmits an authentication request to the cloud print service 400. In step S807, the print bot service 500 transmits an authentication request to the cloud print service 400. The cloud print service 400 is a transmission destination of the data when printing the document or image data registered in the message application service 600. If a previously used access token exists in the account information database 550 of the print bot service 500, processing performed in steps S807 to S812 can be omitted. If the account information database 550 does not have an authority for accessing the cloud print service 400 (e.g., access token does not exist), the cloud print service 400 performs the following processing.

In step S808, the authorization server 440 of the cloud print service 400 notifies the print bot service 500 of the URL for displaying an authentication screen for performing the user authentication.

In step S809, when the print bot service 500 receives an authority authentication request 806 from the cloud print service 400, the print bot service 500 notifies the message application service 600 of the URL. In step S810, the message application service 600 further notifies the client computer 100 of the URL. In step S811, the client computer 100 accesses the received URL and displays an authentication information input screen for logging into the cloud print service 400. An area 903 illustrated in FIG. 9A is an example of an authentication information input screen. The area 903 is displayed by a web server on the client computer 100. The contents of the authentication information input screen are not limited thereto as long as the information in the screen enables the user authentication for the cloud print service 400.

In step S812, the user inputs authentication information to the cloud print service 400 currently being used by the user through the input screen on the message application service 600 and transmits an authentication request to the cloud print service 400. The authorization server 440 of the cloud print service 400 performs the user authentication based on the information transmitted from the client computer 100. In this case, the authorization server 440 performs only the user authentication. However, the client computer 100 may display, after the user authentication is successfully completed, a screen for making an inquiry to the user about whether to permit the print bot service 500 to access the cloud print service 400. In this case, the processing proceeds to step S813 when the print bot service 500 is permitted to access the cloud print service 400 by the user.

In step S813, the cloud print service 400 issues an access token and attaches the issued access token to the print bot service 500 when the user authentication is successfully completed. In step S813, the cloud print service 400 transmits information used by the print bot service 500 for acquiring an access token, to the client computer 100. The print bot service 500 acquires the information via the message application service 600 and accesses the cloud print service 400 by using the information to acquire the access token. In step S814, the print bot service 500 stores the access token acquired from the cloud print service 400, in the account information database 550.

In step S815, the print bot service 500 transmits, by using the acquired access token, a request for acquiring information about the printer queue to be stored in the database 450 of the cloud print service 400. In step S816, based on the authority given to the access token received in step S815, the cloud print service 400 transmits the information about the printer queue associated with the access token to be stored in the database 450, to the print bot service 500. In step S816, the print bot service 500 acquires the name of the printer queue and the print settings of the user. The print settings in this case refers to the name of preset settings including a plurality of setting items. The print bot service 500 may acquire default print settings associated with the user instead of information about the preset settings.

In step S817, the print bot service 500 stores information about the acquired printer queue in the account information database 550. Information stored in the account information database 550 of the print bot service 500 will now be described with reference to FIG. 10. The account information database 550 stores a table 1001 illustrated in FIG. 10. The application identifier (ID) is identification information for identifying the message application service 600. The user ID is identification information for identifying the user using the message application service 600. By referring to the application ID and the user ID, the processing unit 630 can determine which user is accessing the print bot service 500 from which application.

The present exemplary embodiment registers the identification information for the user and the device information for the printer in association with each other. Alternatively, group identification information for identifying a group to which a plurality of users belongs may be associated with the device information for the printer. In this case, users belonging to the group identified by the group identification information stored in the table 1001 can use the printer having the device information stored in association with the group identification information.

The description will be returned to the sequence diagram illustrated in FIG. 8.

In step S818, the print bot service 500 transmits a request for displaying the printer queue associated with the identification information for the user stored in the account information database 550, to the message application service 600. In step S819, the message application service 600 instructs the client computer 100 to display the name of the printer queue and the print settings. In step S819, if no printer is registered in the cloud print service 400, the message application service 600 instructs the client computer 100 to indicate on an application that no printer is registered.

In step S820, if the user has changed the printer queue to be used, the message application service 600 notifies the print bot service 500 of the selected printer queue. In step S821, the print bot service 500 transmits an inquiry to the cloud print service 400 about whether the printer corresponding to the selected printer queue is ready for printing. The print bot service 500 acquires a status of the printer corresponding to the printer queue selected from the cloud print service 400. The print bot service 500 may notify the message application service 600 of the acquired status information to instruct the message application service 600 to display the printer status.

In step S822, upon completion of the acquisition of the printer status, the print bot service 500 transmits an instruction for displaying the print settings and the "Start Printing" button on an application of the message application service 600, to the message application service 600. A message 904 illustrated in FIGS. 9A and 9B is an example of a screen for selecting the printer to be used. When the user selects a button 907, names of the printer queues stored in the print bot service 500 are displayed in list form, as illustrated in FIG. 9B. The user can select the name of the printer queue to be used for image data printing, from the displayed list of printer names. An area 905 illustrated in FIGS. 9A and 9B is an example of a screen for displaying the print settings. "Default Settings" and "2in1+Two-sided" displayed in the area 905 illustrated in FIG. 9A are names of the preset settings, and are the names set by the user when the user registers the preset settings in the cloud print service 400. In the screen illustrated in FIG. 9A, the area 905 displays a list of preset print settings. However, the area 905 may enable the user to perform any print setting. For example, the area 905 may enable the user to set the number of print copies, color/monochrome printing, paper size, printing direction, layout for printing, such as imposition. In step S823, the message application service 600 instructs the client computer 100 to display the "Start Printing" button 908.

In step S824, the user operates the client computer 100 to perform an operation for changing the print settings. In step S825, the message application service 600 notifies the print bot service 500 of the changed print settings. The area 905 is displayed in a state where "Default Settings" is selected, and the default settings are notified to the print bot service 500. Thereafter, the print settings after the change are notified to the print bot service 500, if the user has changed the print settings.

In step S826, the print bot service 500 stores the changed print settings. The processing in steps S824 and S825 is performed each time the user changes the print settings.

In step S827, the user operates the client computer 100 to select the "Start Printing" button 908, and the message application service 600 receives the selection of the "Start Printing" button 908. In step S828, the message application service 600 transmits a printing start instruction to the print bot service 500. In step S828, the message application service 600 transmits, for example, a text "Start Printing" to the print bot service 500. The print bot service 500 analyzes the received text and, if the text "Start Printing" is included in the received text, performs processing illustrated in step S829.

In step S829, the print bot service 500 transmits the document and image data temporarily stored in step S804 and the print settings stored in step S826 to the cloud print service 400, based on the received printing start instruction.

In step S830, the cloud print service 400 transmits a print job reflecting the print settings to the printer corresponding to the specified printer queue. When printing is successfully completed, the printer 200 transmits a notification of successful printing to the cloud print service 400. The print bot service 500 polls the cloud print service 400, detects that printing is successfully completed, and instructs the message application service 600 to display printing completion. A message 906 illustrated in FIGS. 9A and 9B is a notification of printing completion.

As described above, associating the message application service 600 with the print bot service 500 enables printing of the registered document or image data even if the message application service 600 does not have print functions. The print bot service 500 issues an authentication request to the cloud print service 400, and thereby the user can perform printing by specifying a printer registered in the cloud print service 400. This enables the user to perform printing even without registering printers one by one in the print bot service 500.

In the example illustrated in FIG. 8, the user prints data registered in the message application service 600. Alternatively, other users or other client computers may print data registered in the message application service 600. If other users or other client computers can print registered data, data can be printed even if the client computers do not store the data.

Figure 7B:
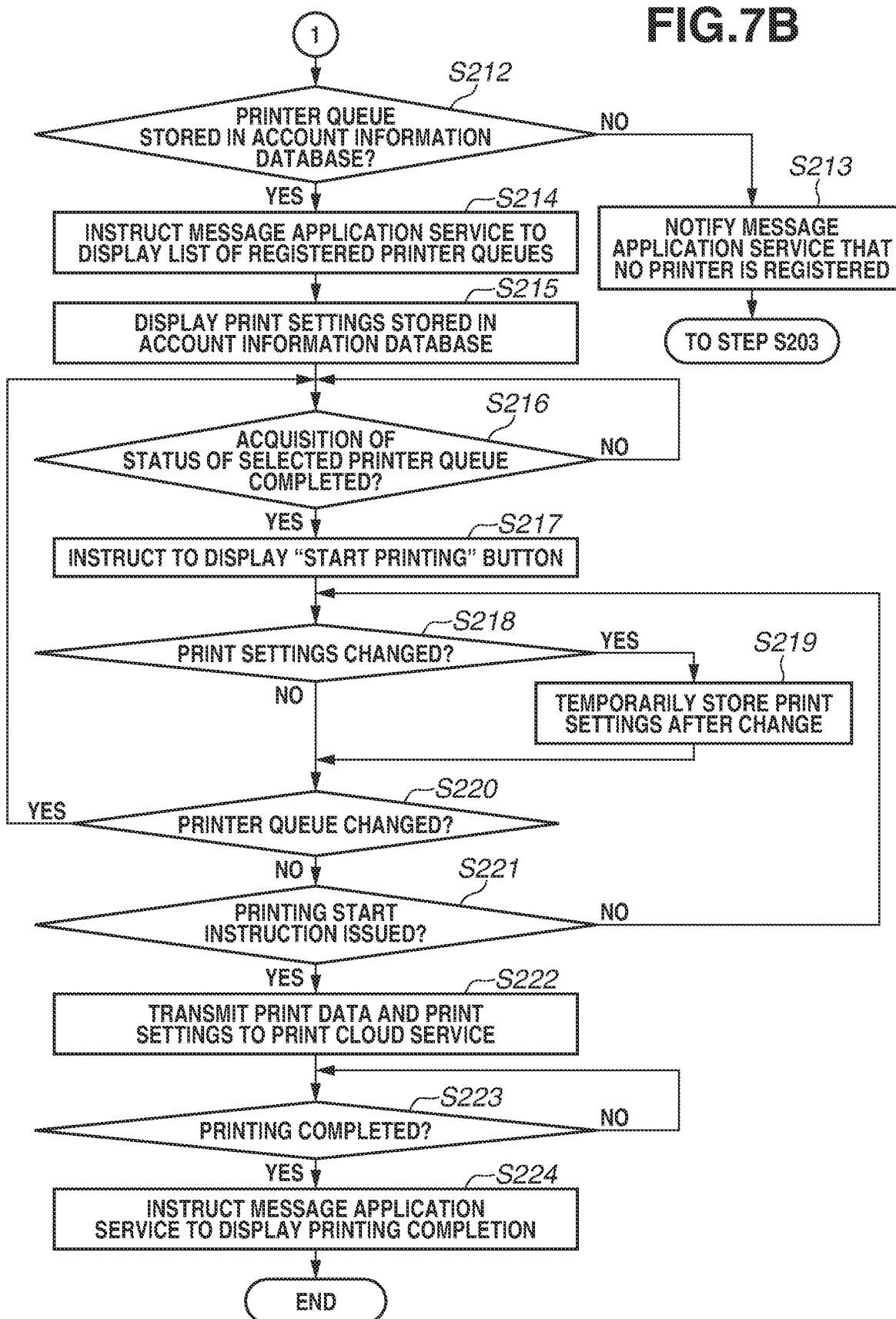
FIG. 7B is the flowchart illustrating the example of processing performed by the print bot service according to the first exemplary embodiment.

Processing performed by the print bot service 500 according to a first exemplary embodiment will now be described with reference to FIGS. 7A and 7B. The following processing is implemented when the CPU of one or either of a plurality of computers executes a program stored in one or either of the plurality of computers included in the print bot service 500. The processing illustrated in FIG. 7A is started when the user opens the screen of the chat room joined by the print bot service 500, from the message application service 600.

When the processing unit 530 of the print bot service 500 receives a notification that the screen of the chat room has been opened from the message application service 600, then in step S201, the processing unit 530 performs activation processing.

In step S202, the processing unit 530 sets the print bot service 500 to be ready for receiving the data registered in the message application service 600 as the data to be printed by the user. The processing unit 530 manages the status of the message application service 600. In step S202, the processing unit 530 changes the status of the message application service 600 to the data registration wait state.

In step S203, the processing unit 530 determines whether a notification that the print data has been registered is received from the message application service 600. When a notification that the document and image data has been registered is received from the message application service 600 (YES in step S203), the processing proceeds to step S204. In contrast, when a notification that the document and image data has been registered is not received from the message application service 600 (NO in step S203), the processing returns to step S203.

In step S204, the processing unit 530 instructs the message application service 600 to display the "Print" button.

In step S205, the processing unit 530 determines whether a notification of the "Print" button selection by the user is received from the message application service 600. If the notification of the "Print" button selection by the user is received (YES in step S205), the processing proceeds to step S206. In contrast, if the notification of the "Print" button selection by the user is not received (NO in step S205), the processing returns to step S205. Alternatively, if the "Print" button is not selected and following data is registered even after a predetermined period of time is elapsed since the time of the instruction to display the "Print" button, the processing may return to step S204. This processing enables the user to print the following registered data even if the user does not print the data registered in the message application service 600.

In step S206, referring to the account information database 550, the processing unit 530 determines whether the access token corresponding to the identification information for the connected message application service 600 is registered. Based on the table 1001 registered in the account information database 550, the processing unit 530 identifies which user (user ID) issued the printing start instruction from which application (application ID) based on the notification of, for example, the "Print" button selection. When the access token corresponding to the application ID and the user ID is registered (YES in step S206), the processing proceeds to step S210. In contrast, when the access token corresponding to the identification information for the message application service 600 is not registered (NO in step S206), the processing proceeds to step S207. In step S207, the processing unit 530 instructs the client computer 100 to display the authentication information input screen. In step S207, the processing unit 530 transmits a user authority authentication request to the cloud print service 400. The cloud print service 400 returns a URL necessary to display the authentication information input screen to the print bot service 500. The URL is transmitted to the client computer 100 via the message application service 600. In step S207, the area 903 illustrated in FIGS. 9A and 9B is displayed.

In step S208, the processing unit 530 determines whether information necessary to acquire the access token from the cloud print service 400 has been acquired. When the user authentication is successfully completed, the cloud print service 400 transmits the information necessary to acquire the access token to the print bot service 500 via the message application service 600. If a predetermined time has elapsed before the print bot service 500 acquires the information necessary to acquire the access token, the processing may return to step S203.

In step S209, the processing unit 530 acquires the access token from the cloud print service 400 by using the information acquired in step S208. The processing unit 530 registers the access token in the table 1001 managed by the account information database 550.

In step S210, the processing unit 530 accesses the cloud print service 400 by using the access token acquired in step S209 to acquire the printer queue information and the print settings. When the processing unit 530 determines that the access token is stored (YES in step S206), the processing proceeds to step S210. In step S210, the processing unit 530 accesses the cloud print service 400 by using the access token registered in the account information database 550 to acquire the printer queue information and the print settings.

In step S211, the processing unit 530 stores the acquired printer queue information and print settings in the table 1001 of the account information database 550.

In step S212, the processing unit 530 determines whether the printer queue associated with the user using the message application service 600 exists in the account information database 550. If the printer queue associated with the user using the message application service 600 is stored in the account information database 550 (YES in step S212), the processing proceeds to step S214. On the other hand, when the printer queue associated with the user is not stored in the account information database 550 (NO in step S212), the processing proceeds to step S213. In step S213, the processing unit 530 instructs the message application service 600 to display a message indicating that the relevant printer is not registered. The processing then returns to step S203.

In step S214, the processing unit 530 instructs the message application service 600 to display the name of the printer queue stored in association with the identification information for the user using the message application service 600. Then, a message 904 illustrated in FIG. 9A is displayed.

In step S215, the processing unit 530 instructs the message application service 600 to display the print settings stored in association with the authenticated user. The processing unit 530 acquires the print settings associated with the user using the message application service 600, from the table 1001 stored in the account information database 550. The processing unit 530 then instructs the message application service 600 to display the print settings. According to the present exemplary embodiment, the processing unit 530 acquires name information of the preset settings preregistered in the cloud print service 400 as a piece of the set with the print settings, and instructs the message application service 600 to display the name information.

In step S216, the processing unit 530 makes an inquiry to the cloud print service 400 about whether the selected printer queue is in the printable status to determine whether the status acquisition is completed. The processing unit 530 performs the processing in step S216 until the status acquisition is completed for the selected printer queue. When the status acquisition is completed for the selected printer queue (YES in step S216), the processing proceeds to step S217.

When the status acquisition is completed for the printer queue (YES in step S216), the processing proceeds to step S217. In step S217, the processing unit 530 instructs the message application service 600 to display the "Start Printing" button 908. In the present exemplary embodiment, the "Start Printing" button 908 is displayed after the printer queue status acquisition. However, the "Start Printing" button 908 may be displayed without acquiring the printer queue status.

In step S218, the processing unit 530 determines whether the user has changed the print settings. If the user has changed the print settings in the area 905 (YES in step S218), the message application service 600 notifies the print bot service 500 of an event. In response to the notification of the event that the print settings have been changed, the processing unit 530 of the print bot service 500 performs the processing illustrated in step S219. In contrast, if the user has not changed the print settings (NO in step S218), the processing proceeds to step S220.

In step S219, the processing unit 530 transfers the changed print settings to the print service 540 and stores the changed print settings in memory of the print bot service 500. In step S220, the processing unit 530 determines whether the printer queue is changed. When the user has changed the printer queue (YES in step S220), the change is notified to the print bot service 500 as an event. When the processing unit 530 of the print bot service 500 receives the event (YES in step S220), the processing returns to step S216. In step S216, the processing unit 530 makes an inquiry to the cloud print service 400 to acquire the status of the printer corresponding to the printer queue after the change.

If the user has not changed the printer queue (NO in step S220), the processing proceeds to step S221. In step S221, the processing unit 530 determines whether the printing start instruction has been issued. When the user selects the "Start Printing" button in the area 905, the message application service 600 detects the event and notifies the print bot service 500 of the "Start Printing" button selection. Upon reception of the event indicating the "Start Printing" button selection by the user from the message application service 600, the processing unit 530 determines that the printing start instruction is issued (YES in step S221). In contrast, if the user has not selected the "Start Printing" button in the area 905, the processing unit 530 determines that the printing start instruction is not issued (NO in step S221). The processing then returns to step S218.

When the printing start instruction is issued (YES in step S221), the processing proceeds to step S222. In step S222, the processing unit 530 transmits the print data stored in the print job storage 510 and the print settings stored in the print service 540 to the cloud print service 400. In step S222, the print service 540 acquires the print data from the print job storage 510 and associates the print data with the print settings. The processing unit 530 transmits the print data and the print settings associated with each other by the print service 540 to the cloud print service 400. When the print data and the print settings are transmitted to the cloud print service 400 in step S222, the document and image data registered in the message application service 600 can be printed.

When the print data and the print settings have been transmitted to the cloud print service 400, then in step S223, the processing unit 530 makes an inquiry to the cloud print service 400 about whether printing is completed. In step S223, the processing unit 530 transmits an inquiry to the cloud print service 400 about whether printing is completed by periodical polling. In response to the notification received from the processing unit 530, the cloud print service 400 determines whether printing is completed. Alternatively, the cloud print service 400 may notify the processing unit 530 of printing completion, and the processing unit 530 may determine that printing is completed in response to the notification.

When the processing unit 530 determines that printing is completed (YES in step S223), the processing proceeds to step S224. In step S224, the processing unit 530 instructs the message application service 600 to display printing completion. The user can know printing completion via the message application service 600, accordingly.

As described above, the user can perform printing by using a printer registered in other services, when the print bot service 500 accesses other services in which the printer information is preregistered.

According to the first exemplary embodiment, the print data and the print settings are transmitted to the cloud print service 400, when the user issues a print instruction by using the message application service 600. The cloud print service 400 transmits the print data and the print settings to the printer corresponding to the specified printer queue, when the cloud print service 400 receives the print data and the print settings. A second exemplary embodiment will now be described centering on a case where the user specifies the cloud print service in which the target printer is registered, from the message application service 600, and transmits the print data and the print settings. In this case, the user operates the message application service 600 to transmit the print data and the print settings to the cloud print service 400 via the print bot service 500. The user then logs into the cloud print service 400 from the printer used, selects the printing target data, and issues a print instruction.

Figure 13B:
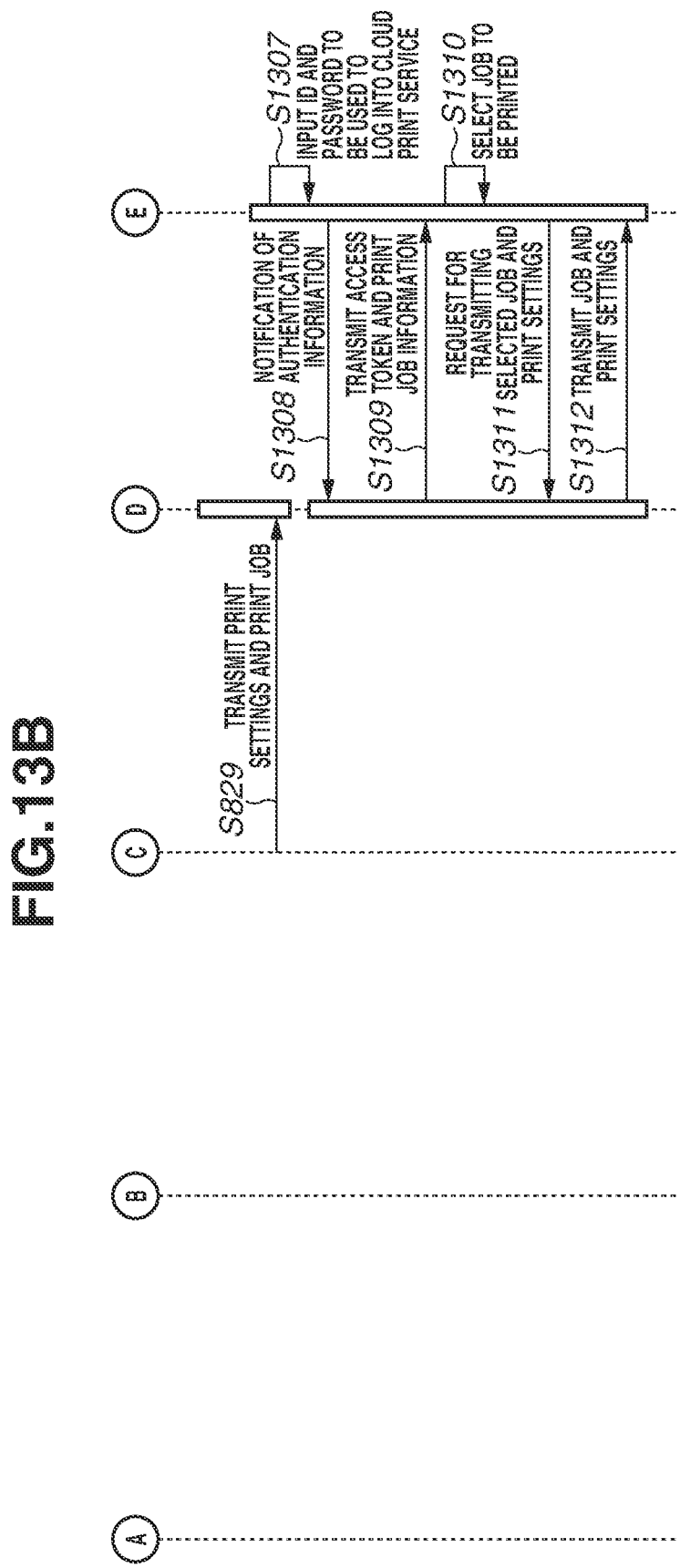
FIG. 13, which is comprised of FIGS. 13A and 13B, is a sequence diagram illustrating an example of processing for performing printing by using the printing system according to the second exemplary embodiment.

FIG. 13, which is comprised of FIGS. 13A and 13B, illustrates a sequence diagram when printing is performed by using the message application service 600 and the print bot service 500 according to the second exemplary embodiment. Processing equivalent to processing according to the first exemplary embodiment (FIG. 8) is assigned the same reference numerals, and redundant descriptions thereof will be omitted.

In step S1300, a print bot service 500 transmits a print settings acquisition request to a cloud print service 400.

In step S1301, the cloud print service 400 transmits the print settings to the print bot service 500. In step S1302, the print bot service 500 stores the print settings in a table 1001 in an account information database 550.

In step S1303, the print bot service 500 transmits a request for displaying the name of the cloud print service 400 and the print settings to the message application service 600. When the message application service 600 receives the display request from the print bot service 500, then in step S1304, the message application service 600 instructs a client computer 100 to display the name of the cloud print service 400 and the print settings to be used for printing. If the print bot service 500 has an access token for a plurality of the cloud print services 400 and stores the print settings for a plurality of the cloud print services 400, the message application service 600 instructs the client computer 100 to display the plurality of the cloud print services 400 in a selectable manner. In step S1305, the client computer 100 receives the selection of the cloud printing service 400 to be used from the user. In step S1306, the message application service 600 notifies the print bot service 500 of the selected cloud print service 400.

In step S829, the print settings and a job are transmitted to the cloud print service 400. In step S1307, the user then inputs authentication information, such as the ID and the password, to be used for the authentication of the cloud print service 400 to the printer to be used for printing. According to the present exemplary embodiment, the user accesses the cloud print service 400 by using the ID and the password input by the user. The user may acquire the access token in the first access, and perform the second and subsequent accesses by using the access token.

In step S1308, a printer 200 notifies the cloud print service 400 of the authentication information, such as the ID and the password, input by the user. The cloud print service 400 performs user identification by using the received authentication information. When the authentication is successfully completed, then in step S1309, the cloud print service 400 transmits the access token and the information about the print job to the printer 200. The cloud print service 400 transmits the information about the print job stored in association with the authenticated user to the printer 200. Examples of job information include file names of the printing target document and image data, and information, such as date and time when the data is registered in the cloud print service 400, and print settings (e.g., color mode, and the number of print copies). If the cloud print service 400 fails in the user authentication, the cloud print service 400 notifies the printer 200 that the authentication has failed. In response to the notification, the printer 200 displays a message indicating that the authentication has failed on the operation unit 202.

In step S1310, the printer 200 displays the job information received from the cloud print service 400 on an operation unit 202, and receives the selection of the job to be printed from the user.

When the user selects a job, then in step S1311, the printer 200 transmits a request for transmitting the print data and the print settings for the selected job to the cloud print service 400. In step S1312, the cloud print service 400 transmits the job including the print data based on the transmission request and the print settings to the printer 200.

The printer 200 performs printing based on the received print data and print settings and transmits a notification of printing completion to the cloud print service 400.

Figure 11A:
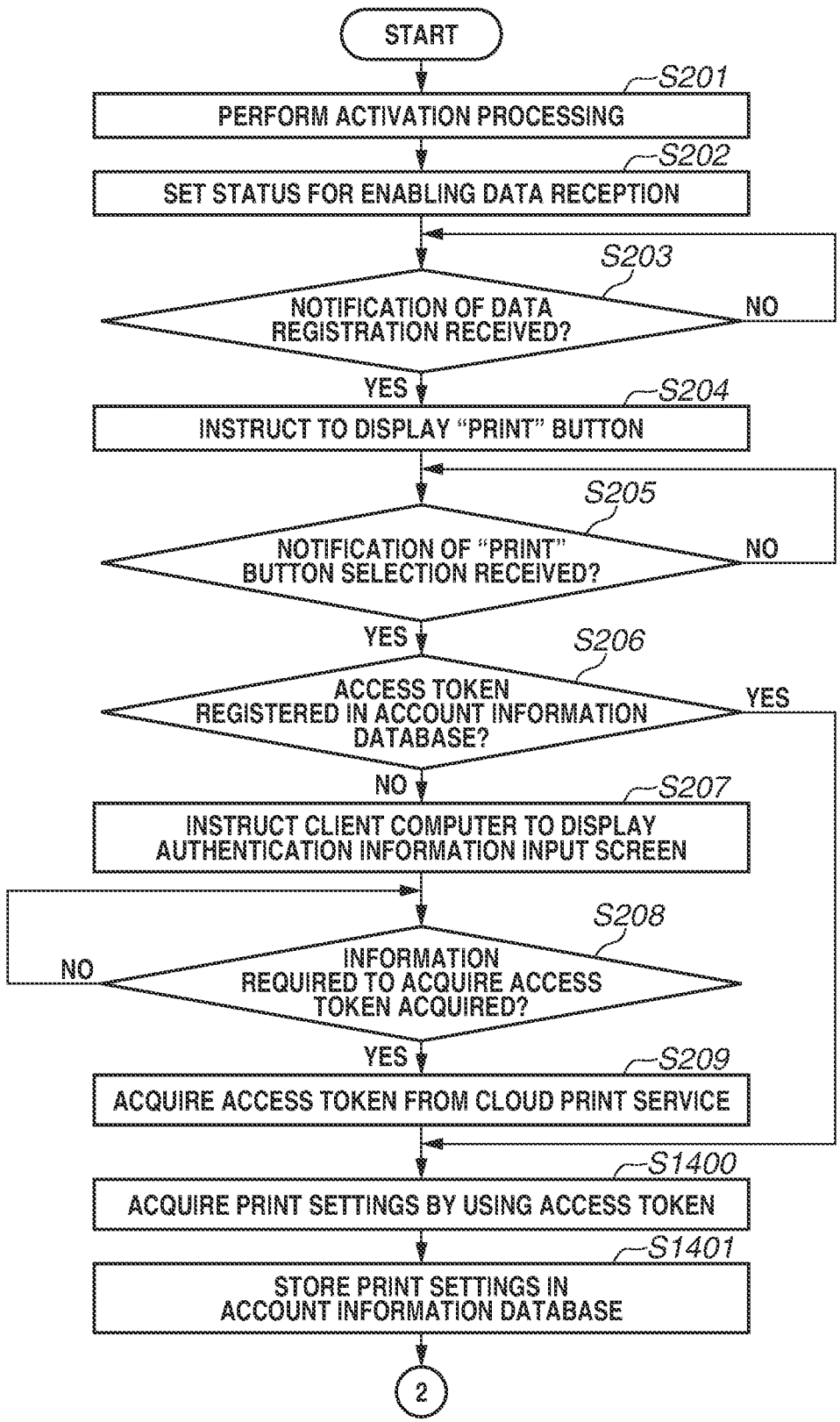
FIG. 11A is a flowchart illustrating an example of processing performed by the print bot service according to a second exemplary embodiment.
Figure 11B:
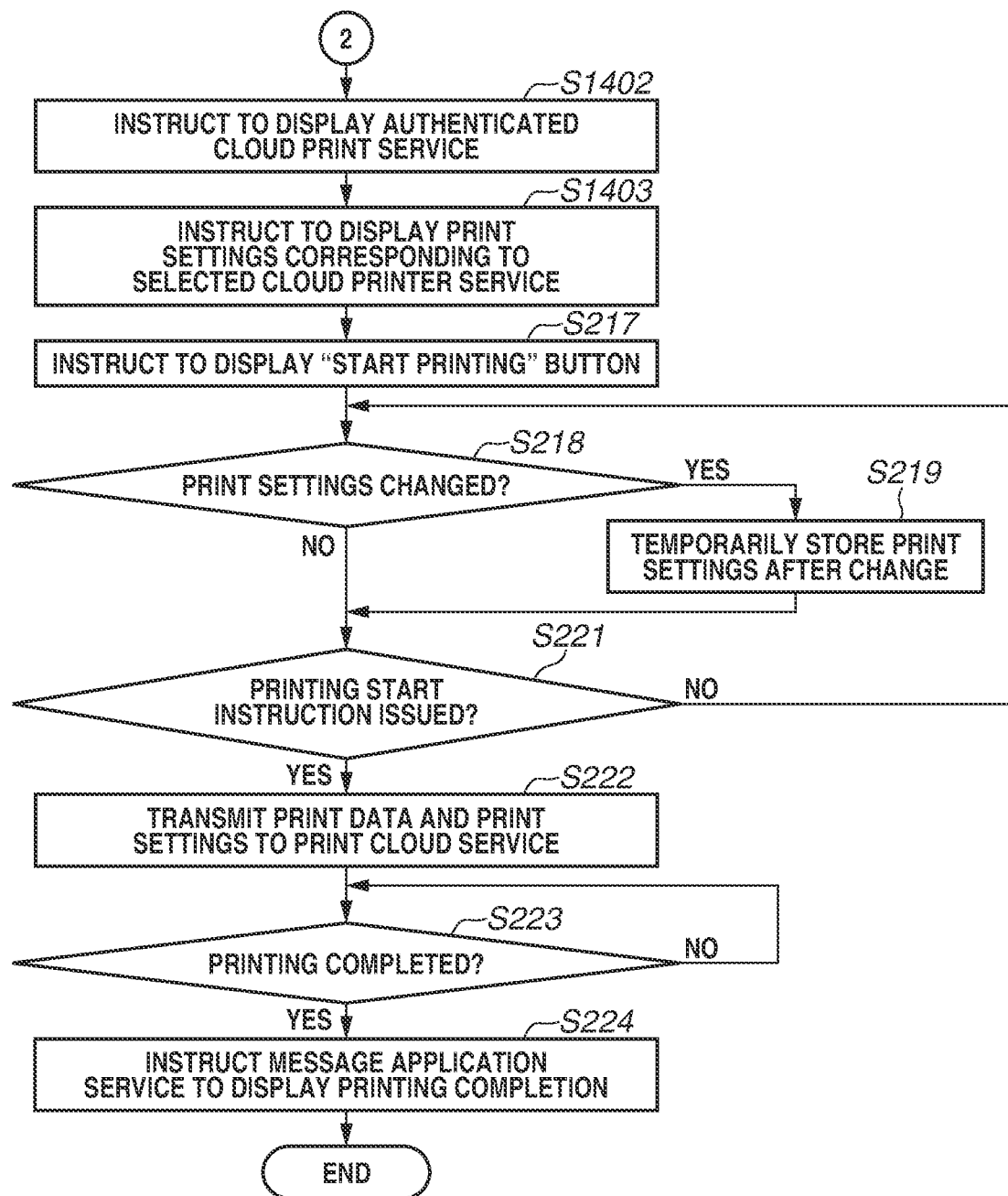
FIG. 11B is the flowchart illustrating the example of processing performed by the print bot service according to the second exemplary embodiment.

FIGS. 11A and 11B are flowcharts illustrating processing performed by the print bot service 500 according to the second exemplary embodiment. Processing common to FIGS. 7A and 7B is assigned the same reference numerals, and redundant descriptions thereof will be omitted. The processing illustrated in FIGS. 11A and 11B is implemented when the CPU of one or either of a plurality of computers executes a program stored in one or either of the plurality of computers in the print bot service 500.

In step S1400, a processing unit 530 accesses the cloud print service 400 by using the acquired access token to acquire the print settings corresponding to the authenticated user. Unlike the first exemplary embodiment, the processing unit 530 acquires only the print settings and does not acquire information about printer queues registered in the cloud print service 400. In step S1401, the processing unit 530 stores the print settings, which have been acquired from the cloud print service 400, in the table 1001 of the account information database 550.

In step S1402, the processing unit 530 accesses the message application service 600 and instructs the client computer 100 to display the authenticated cloud print service 400. When the print bot service 500 has access tokens of a plurality of the cloud print services 400, the processing unit 530 instructs the client computer 100 to display the names of the plurality of the cloud print service 400.

In step S1403, the processing unit 530 accesses the message application service 600 and instructs the client computer 100 to display the print settings corresponding to the selected cloud print service 400. Thereafter, the processing proceeds to step S217.

The above described processing completes registering the print data and the print settings in the cloud print service 400.

Subsequently, the user operates the printer 200 to access the cloud print service 400, and thereby the user can print the registered print data. The server system according to the second exemplary embodiment makes it possible to perform printing by using a printer registered in the cloud print service 400 even if the user does not select a printer to be used for printing before issuing a printing start instruction.

The server system according to embodiments of the present disclosure makes it possible to perform printing by using a printer registered in other services if the print bot service 500 accesses other services in which the printer information has already been registered.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium

What is claimed is:

1. A control method for controlling an information processing apparatus, the control method comprising:
    receiving a notification that is issued in a case where image data is uploaded to a chat service;
    determining, based on a predetermined user instruction related to the uploaded image data, that an access token corresponding to a user logged into the chat service is stored;
    causing a display of the information processing apparatus to display an object for inputting user identification information, in a case where it is determined that the access token is not stored;
    obtaining the access token by using the input user identification information;
    obtaining information about a printing apparatus that has been registered with a server system from the server system providing a function related to printing by using the obtained access token; and
    causing the display of the information processing apparatus to display the obtained information.

2. The control method according to claim 1, wherein the object is not displayed in a case where the access token corresponding to the user is stored.

3. The control method according to claim 1, wherein the printing apparatus is able to be used for printing based on the image data uploaded to the chat service.

4. The control method according to claim 1, wherein the predetermined user instruction is related to printing based on the image data uploaded to the chat service.

5. The control method according to claim 1, wherein the user identification information includes at least one of a user ID and a password.

6. The control method according to claim 1, further comprising:
    receiving a print instruction for printing based on data uploaded to the chat service, wherein the server system processes the data transmitted based on the print instruction.

7. An information processing apparatus comprising:
    a controller configured to:
        receive a notification that is issued in a case where image data is uploaded to a chat service;
        determine, based on a predetermined user instruction related to the uploaded image data, that an access token corresponding to a user logged into the chat service is stored;
        cause a display of the information processing apparatus to display an object for inputting user identification information, in a case where it is determined that the access token is not stored;
        obtain the access token by using the user identification information;
        obtain information about a printing apparatus that has been registered with a server system from the server system proving providing a function related to printing by using the obtained access token; and
        cause the display of the information processing apparatus to display the obtained information.

8. The information processing apparatus according to claim 7, wherein the object is not displayed in a case where the access token corresponding to the user is stored.

9. The information processing apparatus according to claim 7, wherein the printing apparatus is able to be used for printing based on the image data uploaded to the chat service.

10. The information processing apparatus according to claim 7, wherein the predetermined user instruction is related to printing based on the image data uploaded to the chat service.

11. The information processing apparatus according to claim 7, wherein the user identification information includes at least one of a user ID and a password.

12. The information processing apparatus according to claim 7, wherein the controller is further configured to:
    receive a print instruction for printing based on data uploaded to the chat service, wherein the server system processes the data transmitted based on the print instruction.

13. A non-transitory computer readable storage medium storing a program for causing a processor to execute a method of controlling an information processing apparatus, the method comprising:
    receiving a notification that is issued in a case where image data is uploaded to a chat service;
    determining, based on a predetermined user instruction related to the uploaded image data, that an access token corresponding to a user logged into the chat service is stored;
    causing a display of the information processing apparatus to display an object for inputting user identification information, in a case where it is determined that the access token is not stored;
    obtaining the access token by using the input user identification information;
    obtaining information about a printing apparatus that has been registered with a server system from the server system providing a function related to printing by using the obtained access token; and
    causing the display of the information processing apparatus to display the obtained information.

14. The non-transitory computer readable storage medium according to claim 13, wherein the object is not displayed in a case where the access token corresponding to the user is stored.

15. The non-transitory computer readable storage medium according to claim 13, wherein the printing apparatus is able to be used for printing based on the image data uploaded to the chat service.

16. The non-transitory computer readable storage medium according to claim 13, wherein the predetermined user instruction is related to printing based on the image data uploaded to the chat service.

17. The non-transitory computer readable storage medium according to claim 13, wherein the user identification information includes at least one of a user ID and a password.

\* \* \* \* \*